United States Patent [19]

Maeda et al.

[11] 4,067,044
[45] Jan. 3, 1978

[54] INFORMATION RECORDING AND RETRIEVAL APPARATUS

[75] Inventors: Takesi Maeda, Kokubunji; Mahito Kohmoto, Tokyo; Seiji Yonezawa, Hachioji, all of Japan

[73] Assignee: Hitachi, Ltd., Japan

[21] Appl. No.: 654,966

[22] Filed: Feb. 3, 1976

[30] Foreign Application Priority Data

Feb. 5, 1975 Japan .................. 50-14401

[51] Int. Cl.$^2$ .............. H04N 5/76; G11B 21/08
[52] U.S. Cl. ............. 358/128; 179/100.3 V; 179/100.4 D; 360/72; 250/202; 274/9 RA; 360/77
[58] Field of Search ............. 179/100.3 V, 100.3 D, 179/100.4 D, 100.3 B, 100.4 R; 360/72, 77; 358/128; 250/202, 570, 201, 203; 274/41.6 R, 9 RA, 13 R, 23 R; 340/173 LM

[56] References Cited

U.S. PATENT DOCUMENTS

| | | | |
|---|---|---|---|
| 3,126,535 | 3/1964 | Streeter | 360/77 |
| 3,662,363 | 5/1972 | Chertok | 179/100.4 D |
| 3,845,500 | 10/1974 | Hart | 360/77 |
| 3,876,827 | 4/1975 | Janssen | 179/100.3 V |
| 3,931,457 | 1/1976 | Mes | 360/72 |
| 3,931,460 | 1/1976 | Watson | 179/100.3 V |

*Primary Examiner*—Bernard Konick
*Assistant Examiner*—Alan Faber
*Attorney, Agent, or Firm*—Craig & Antonelli

[57] ABSTRACT

An information signal is recorded on information tracks wobbling along concentric circles or a spiral line on a recording disc in superposed relation with a standard signal whose frequency varies depending on the recorded position on the disc. Desired information can be selectively reproduced accurately at a high speed by applying an external signal having the same frequency as that of the standard signal recorded on the recording disc together with the desired information, comparing the frequency of the standard signal being reproduced with that of the externally applied signal, selecting the desired information track on the basis of the result of frequency comparison for reproducing the desired information, and after the selection of the desired information track, carrying out fine tracking control while comparing the envelope of the reproduced information signal with the reproduced standard signal, so that the reproducing beam spot can accurately track the desired information track.

20 Claims, 15 Drawing Figures

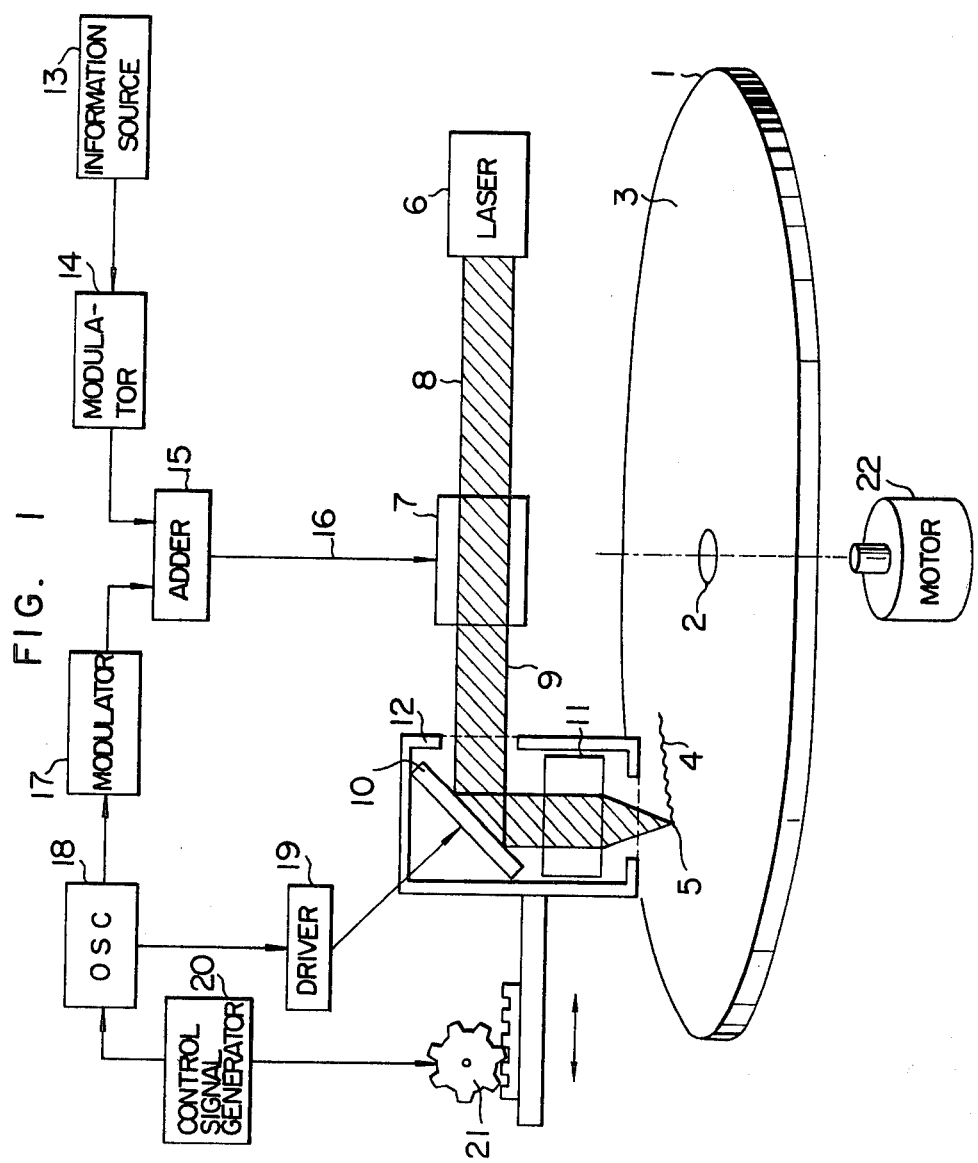

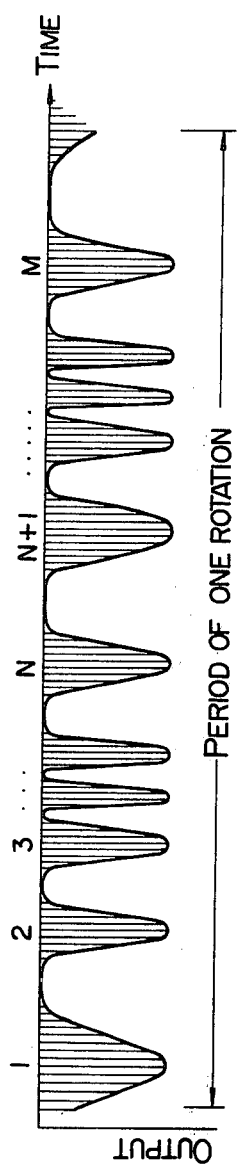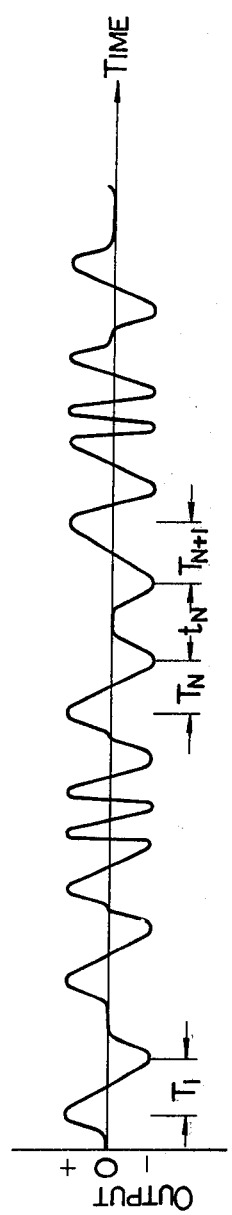

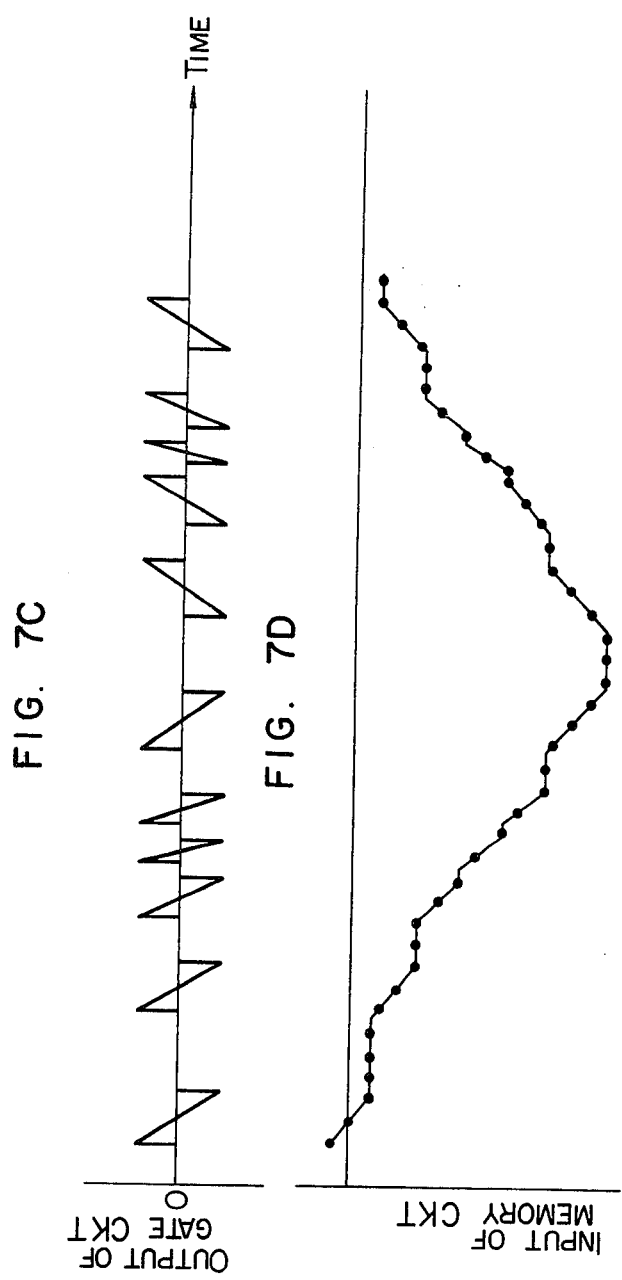

INFORMATION RECORDING AND RETRIEVAL APPARATUS

BACKGROUND OF THE INVENTION

1. Field of the Invention

This invention relates to information recording apparatus and an information retrieval or reproducing apparatus in which information such as a video signal, audio signal or computer data signal can be recorded in high packing density on many tracks formed on a rotary recording medium, and any desired information can be easily read or reproduced from the corresponding track on the recording medium. This invention relates also to such an information recording medium. More particularly, this invention relates to apparatus of the kind above described in which information such as a video signal, audio signal or computer data signal is converted into a binary signal form to be recorded by recording means in a high packing density in the form of an irregular pattern of projection and depression or light and shade on a rotary recording medium or disc without any mechanical contact with the recording medium, and any desired information can be accurately reproduced by reproducing means without any mechanical contact with the recording medium, for example, by use of a radiation beam such as an optical beam.

2. Description of the Prior Art

In a reproducing apparatus of the kind above described, it is necessary to detect an information track having desired information recorded thereon from among many information tracks carrying various information recorded in high packing density and to shift a reproducing beam spot to the detected track position so that the desired information can solely be accurately retrieved for reproduction.

Philips Technical Review, Vol. 33, 1973, No. 7 describes in detail a method of information retrieval from a recording disc having information recorded on information tracks extending a spiral form from the outer peripheral edge toward the center of the disc. The method disclosed in this publication comprises the steps of drawing for locating a reproducing beam spot on one of the information tracks adjacent to the outer peripheral edge of the disc, shifting the beam spot in the radial direction of the disc while crrying out tracks control to prevent the beam spot from escaping from the information track, reproducing the information recorded on this information track, comparing the reproduced information with desired information to detect coincidence therebetween, and after detecting the information track on which the desired information is recorded, shifting the beam spot to the desired information track. However, this method is defective in that a great length of time is required until the desired information track is detected.

SUMMARY OF THE INVENTION

It is a primary object of the present invention to provide an information recording apparatus for recording information of the kind above described on an information recording medium, and to provide an information retrieval or reproducing apparatus in which means are provided so that desired information can be selectively reproduced at a high speed and accurately from among many information recorded on such an information recording medium.

According to the present invention which attains the above object, an information signal to be recorded and a standard signal whose frequency varies depending on the recording position of the information signal on a rotary recording medium are superposed and modulated into a signal form suitable for recording, and this modulated signal is used to modulate a radiation beam such as an optical beam, electron beam or electro-magnetic beam, this modulated radiation beam being directed toward the recording medium to record the information on the surface of the recording medium in the form of, for example, an irregular pattern of projection and depression or light and shade. During tracking for reproduction, a reproducing radiation beam is directed toward the recording medium having the information recorded in the manner above described. Desired information can be retrieved by comparing the previously known frequency used for recording the desired information with the frequency of the standard signal in the signal being reproduced, and shifting the radiation beam spot until the coincidence between the frequencies is detected, thereby detecting the desired information track position for the retrieval of the desired information from this specific information track.

The present invention is especially remarkably advantageous in that not only the standard signal indicates the position of information to be retrieved on a rotary medium but also it can be utilized for fine tracking control during reproduction of information recorded by recording means on a rotary recording medium witout any mechanical contact with the recording medium, for example, by use of a radiation beam such as an optical beam.

During reproduction of information recorded on tracks arranged in concentric circle form or spiral form on a rotary recording medium, tracking for the purpose of reproduction tends to be disturbed due to out of registration between the center of rotation of the recording medium during recording and that during reproduction. In an effort to attain precise tracking control, the inventors have proposed to fine tracking control system in which an information signal to be recorded and a signal having a fixed frequency are recorded in superposed relation on tracks in a concentric circle or a spiral form on a rotary recording medium while imparting fine oscillation or wobbling to a recording beam spot in synchronism with the above frequency, and during reproduction of information, the amount and direction of deviation of a reproducing radiation beam spot from the information track are detected by detecting means utilizing the reproduced signal of fixed frequency and signal due to the fine oscillation or wobbling so that fine tracking can be achieved utilizing the output signal of the detecting means. Such a system is disclosed in U.S. application Ser. No. 439,039, filed Feb. 4, 1974, now abandoned. The present invention provides a very economical and effective information retrieval apparatus by virtue of the fact that the standard signal above described is used as both an address signal for information retrieval and a tracking or drawing control signal. Therefore preferred forms of the present invention include an information recording apparatus, a recording medium on which information is recorded, and an information retrieval or reproducing apparatus.

The information recording apparatus according to the present invention comprises:

a. means for causing rotation of a rotary recording medium;

b. means for directing a recording radiation beam toward said rotary recording medium;

c. tracking means for controlling the position of the beam spot of said radiation beam on said rotary recording medium relative to the position of said rotary recording medium;

d. an oscillator operatively cooperating with said tracking means for generating a standard signal having a frequency varying depending on the position of said tracking means;

e. an information signal source;

f. a modulator for modulating said radiation beam by the combination of the output signal of said oscillator and the output signal of said information signal source; and g. means for oscillating or wobbling the beam spot on the recording surface of said rotary recording medium in a direction normal to the direction of rotation of said rotary recording medium.

The rotary information recording medium according to the present invention comprises a recording surface having an information signal and a standard signal recorded in superposed relation in binary signal form on information tracks wobbling along concentric circles or a spiral line, said standard signal having a frequency varying depending on the position or track on said rotary recording medium.

The information retrieval apparatus or information reproducing apparatus according to the present invention comprises:

a. means for causing rotation of said rotary recording medium;

b. means for directing a reproducing radiation beam toward anyone of the information tracks on said rotary recording medium;

c. an opto-electrical converter for converting into an electrical signal the radiation beam directed from said beam directing means and passing through or reflected from said information track;

d. a detector for detecting from said electrical signal a signal including information representing deviation of the spot of said radiation beam from said information track;

e. a demodulator for reproducing the information signal and standard signal from said electrical signal for separating the information signal from the standard signal;

f. a retrieval instruction circuit for generating a signal having the same frequency as that of the standard signal recorded together with the information signal to be reproduced;

g. a comparator for comparing the reproduced standard signal output of said demodulator with the output of said retrieval instruction circuit;

h. means for comparing the reproduced standard signal output of said demodulator with the output of said detector, thereby detecting the degree and direction of deviation of said beam spot from said information track;

i. means responsive to the output of said comparator for shifting the position of said beam spot to the information track having recorded thereon the desired information to be reproduced; and j. tracking means for controlling the position of said radiation beam directing means relative to that of said rotary recording medium so that said beam spot can exactly track the desired information track during reproduction of the desired information.

The above-mentioned and other features and objects of the present invention will become more apparent by reference to the following detailed description taken in conjunction with the accompanying drawings.

BRIEF DESCRIPTION OF THE DRAWINGS

FIG. 1 is a block diagram showing the structure of an embodiment of the information recording apparatus according to the present invention.

FIGS. 7A, 7B, 7C and 7D are waveform diagrams for illustrating the operation of the drawing control section shown in FIG. 6.

DESCRIPTION OF THE PREFERRED EMBODIMENTS

Figure 2A:
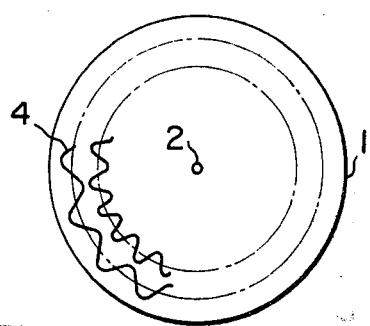
FIGS. 2A, 2B, 2C and 2D show schematically various information track patterns on two kinds of rotary recording mediums on which information is recorded according to the present invention.

FIG. 1 is a block diagram showing the structure of an embodiment of the information recording apparatus according to the present invention. Referring to FIG. 1, an information signal source 13 supplies an information signal which may be a television picture signal, sound signal or computer data signal in analog or pulse form. This information signal may be subjected to frequency conversion as required so that the frequency band thereof may not overlap that of a standard signal described below or the frequency thereof may be changed to that suitable for recording. A standard signal generator or an oscillator 18 generates a standard signal whose frequency varies continuously or stepwise and which has a constant amplitude. The standard signal generator 18 is generally designed to generate a sinusoidal waveform, but the generated waveform is in no way limited to that above specified. This standard signal is utilized as a reference signal for attaining drawing, fine tracking control and information selection (retrieval) control during reproduction in a reproducing apparatus. This standard signal may also be subjected to frequency conversion as required.

The information signal and standard signal are respectively suitably modulated by modulators 14 and 17 so as to provide phase information suitable for modulation of a radiation beam described below. The signal modulation suitable for this purpose includes frequency modulation (FM), pulse width modulation (PWM), and pulse position modulation (PPM). This modulation will be referred to hereinafter as binary modulation. The information signal and standard signal subjected to the binary modulation are applied to an adder 15, and the output signal 16 of the adder 15 is applied to an intensity modulator 7. A radiation beam 8 emitted from a beam source 6 is subjected to intensity modulation by this intensity modulator 7, and the modulated signal is generally an on-off signal. While an optical beam, an electron beam or any other suitable beam may be used as this radiation beam 8, an optical beam emitted from a laser beam source is most effectively used for this purpose. The radiation beam 9 appearing from the intensity modulator 7 after being subjected to the intensity modulation is guided by beam guide means 12 to be directed toward a predetermined position on a rotary recording medium or disc 1 to form a microspot 5 on such position. This beam guide means 12 comprises an optical deflector and an optical condenser 11.

The standard signal generated by the standard signal generator 18 is applied also to optical deflector drive means 19 which provides a signal for driving the deflector 10. Although this deflector drive means 19 is shown provided separately from the deflector 10 in FIG. 1, it may be constructed integrally with the deflector 10. The microspot 5 deflected by the deflector 10 driven by the deflector drive means 19 makes thus fine oscillation or wobbling motion in a direction normal to the direction of rotation of the rotary medium 1, that is, in a radial direction in the case of the disc shown in FIG. 1.

A control signal generator 20 generates a control signal which varies depending on the position of information to be recorded on the rotary recording medium 1. A portion of the output of the control signal generator 20 is applied to the standard signal generator 18 to change the oscillation frequency, while another portion of the output of the control signal generator 20 is applied to drive means 21 which controls the position of the beam guide means 12. This drive means 21 drives the beam guide means 12 in a direction normal to the direction of rotation of the rotary recording medium 1. A drive motor 22 is connected to the rotary recording medium or disc 1 to rotate the same.

In the above embodiment, the beam guide means 12 is arranged to move relative to the rotary recording medium 1. It is apparent, however, that the tracking path of the microspot 5 on the rotary recording medium 1 is the same when the rotary recording medium 1 and drive means therefor are arranged to move relative to the beam guide means 12.

Figure 2B:
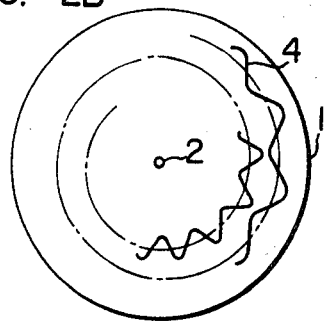
Figure 2C:
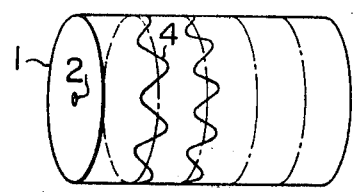
Figure 2D:
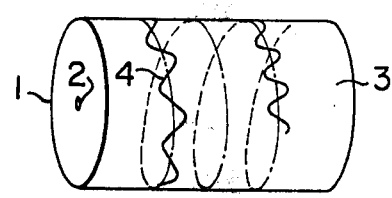

FIGS. 2A, 2B, 2C and 2D show schematically the patterns of information tracks formed on two kinds of rotary recording mediums, that is, the tracking path of the microspot 5 on such recording mediums. FIGS. 2A and 2B represent the information tracks formed on a disc, while FIGS. 2C and 2D represent those formed on a drum. In FIGS. 2A and 2C, the information tracks are formed concentrically, while in FIGS. 2B and 2D, they are formed spirally. These information tracks can be formed in various patterns by changing the frequency of the standard signal continuously or stepwise as described with reference to FIG. 1 or by changing the relative positions of the rotary recording medium 1 and beam guide means 12 continuously or stepwise. For example, one of methods for recording information on the disc 1 comprises keeping the beam spot directed toward a specific point in the radial direction of the disc during one complete rotation of the disc, and using the standard signal of a specific frequency for recording the information. Similarly, while moving the beam spot stepwise in the radial direction of the disc 1, information is recorded on the disc by changing the frequency of the standard signal each time the radial position of the beam spot directed toward the disc is changed. According to this recording method, the information tracks are formed concentrically on the disc, and a specific information track in the concentric information tracks corresponds to a specific frequency of the standard signal.

Another recording method comprises continuously changing the radial position of the beam spot on the disc 1 at a constant speed, and changing the frequency of the standard signal continuously or stepwise at the same time for recording the information. According to this latter method, the information tracks are formed spirally on the disc, and by the detection of the standard signal recorded on a specific information track during reproduction, the radial position of the specific information track being reproduced can be readily identified with the track number counted from the outer or inner peripheral edge of the disc.

The basic principle of the present invention described hereinafter applies in much the same manner to the spirally arranged information tracks as it applies to the concentrically arranged information tracks. Therefore, the following description will merely refer to the concentrically arranged information tracks.

Figure 3:
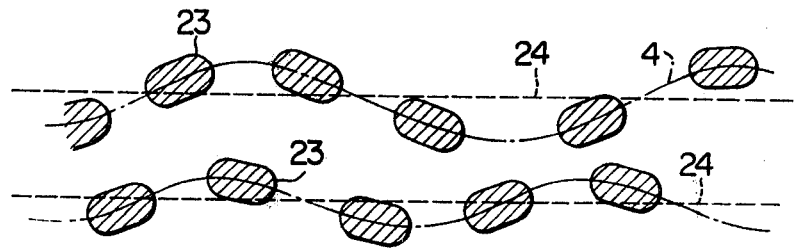
FIG. 3 is an enlarged view of part of the information tracks on the rotary recording mediums shown in FIGS. 2A to 2D.

FIG. 3 is an enlarged view of part of the tracks having the information recorded thereon. Referring to FIG. 3, flat ovals 23 represent the recorded information (including the standard signal) obtained by subjecting the radiation beam to the intensity modulation by the binary modulation signal. It will be seen from FIG. 3 that the centerline 4 of the flat ovals 23 oscillates along concentric circles or a spiral line 24 in synchronism with the standard signal. By way of example, the recording mode of information on the rotary recording medium will be described in more detail.

The minor axis of each flat oval 23, that is, the size of the microspot 5 is about 0.8 $\mu$m, and the major axis thereof is about 2 $\mu$m. The spacing between the adjacent information tracks, that is, the spacing between the centerlines 24 of oscillation is about 2 to 3 $\mu$m. The amount of information recorded on the disc corresponds to a series of picture informatin broadcast during a broadcasting period of time of about 30 minutes in the case of a television signal. Therefore, when one frame of a television picture is recorded on each information track, a series of picture information corresponding to 30 frames per second $\times$ 60 seconds $\times$ 30 minutes = 54,000 stills or scenes can be recorded on the disc.

The amplitude of the fine oscillation or wobbling is selected to be about 0.3 to 0.4 $\mu$m so that the adjacent information tracks may not overlap each other. Further, the frequency of the standard signal is selected to a range from 10 Hz to 600 kHz, and the frequency value allotted to one of the tracks differs by about 10 Hz from that allotted to the adjacent one. The flat ovals 23 carrying the information are recorded on the recording medium 1 in the form of an irregular patterns of projection and depression or light and shade.

The embodiment described with reference to FIGS. 1 to 3 does not substantially differ from the prior art disclosure, for example, the disclosure of Philips Technical Review, Vol. 33, 1973, No. 7 cited previously except that the information tracks are formed in wobbling fashion and that the information signal and standard signal are included in the information tracks. Thus, detailed description of the structure and operation of this embodiment may be unnecessary.

Figure 4:
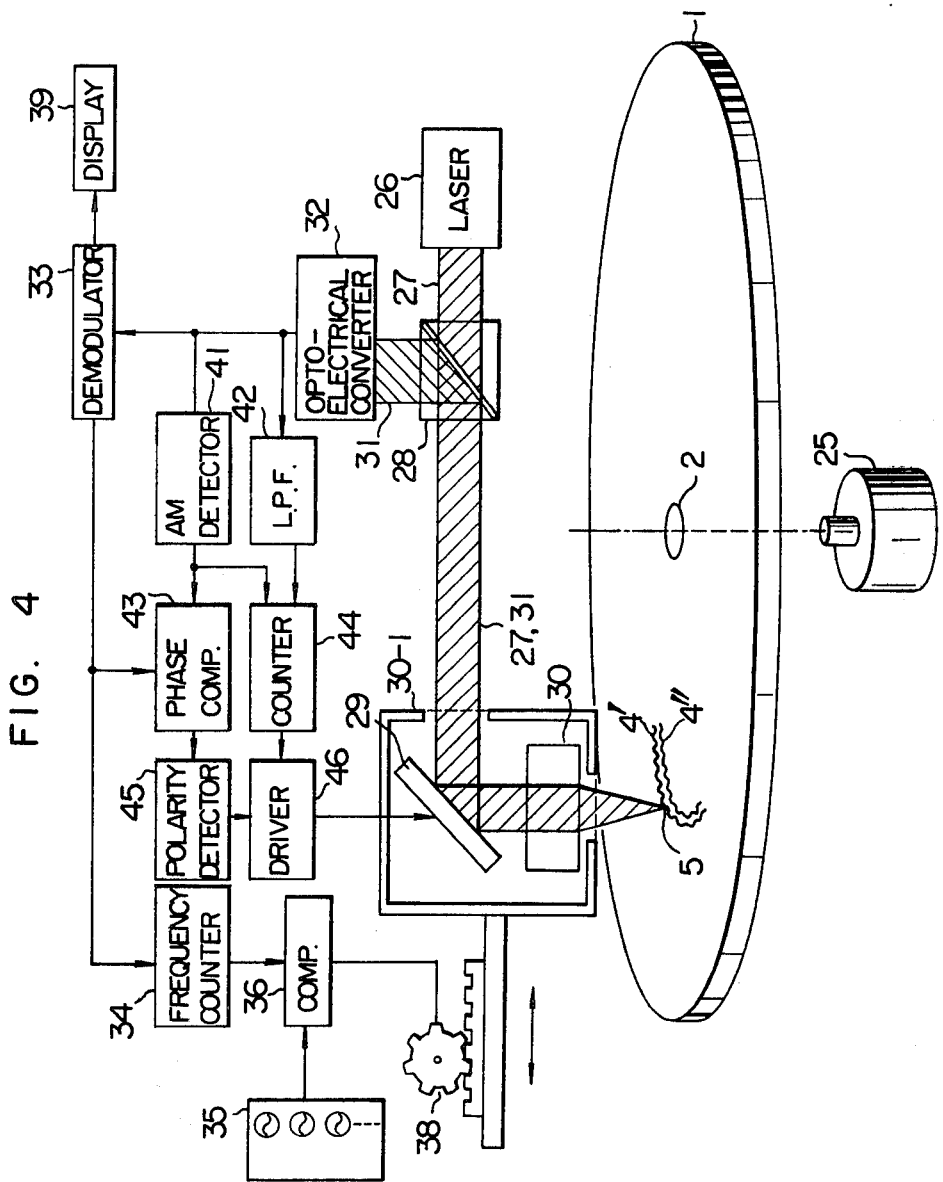
FIG. 4 is a block diagram showing the structure of an embodiment of the information retrieval or reproducing apparatus according to the present invention.

FIG. 4 shows the structure of an embodiment of the information retrieval apparatus or information reproducing apparatus according to the present invention.

Referring to FIG. 4, an information signal and a standard signal are recorded on information tracks 4 (4', 4") arranged concentrically or spirally around the center 2 of rotation of a rotary recording medium or disc 1 as shown in FIGS. 2A and 2B. For simplicity of description, the embodiment shown in FIG. 4 will be described with reference to the case in which these information tracks 4 are formed concentrically on the disc 1. A drive motor 25 is connected to the disc 1 to rotate the same. An optical beam 27 emitted from a radiation beam source 26, which may be a laser beam source, passes through a half mirror 28 to be directed through beam guide means 30-1 consisting of a deflector 29 and an optical condenser 30 toward the rotating disc 1 to form a microspot 5 thereon.

The reflected beam 31 is directed through the optical condenser 30, deflector 29 and half mirror 28 to enter an opto-electrical converter 32. The output of this opto-electrical converter 32 is applied to a demodulator 33 which operates in a manner reverse to that of the modulators 14 and 17 in FIG. 1 to reproduce the information signal and standard signal. The standard signal thus reproduced is applied to a frequency counter 34 which counts the frequency of the standard signal included in the information being reproduced, that is, the frequency recorded at the position of the microspot 5. The output of the frequency counter 34 is applied to a comparator 36 to be compared with an output of a retrieval instruction circuit 35 representative of the frequency value of the standard signal corresponding to the information track having desired information recorded thereon. When the output of the frequency counter 34 coincides with the output of the retrieval instruction circuit 35 or lies within a desired frequency range, the beam guide means 30-1 including the deflector 29 and optical condenser 30 ceases to operate, while when no coincidence is found therebetween, the beam guide means 30-1 is controlled to continuously move the microspot 5 in the radial direction of the disc 1 from the outer peripheral edge toward the center 2 of the disc 1 or from the center 2 toward the outer peripheral edge of the disc 1.

The frequency counter 34 may be replaced by a frequency-voltage converter which converts into a voltage signal the frequency of the standard signal extracted from the information each time the microspot 5 traverses one of the information tracks 4. The frequency of the standard signal corresponding to the information track having desired information recorded thereon may also be converted into a voltage signal. These two voltage signals may be applied to a differential detector, and the level and sign of the output voltage of the differential detector may be detected. In this manner, the location of the desired information track on the radially inner or outer side of the disc relative to the position of the information track being traversed by the microspot 5 can be detected on the basis of the polarity of the output voltage of the differential detector. Further, the radial spacing between the desired information track and the information track 4 being traversed by the microspot 5 can also be detected on the basis of the level of the output voltage of the differential detector. Therefore, the output voltage of the differential detector may be utilized to control drive means 38 which acts to shift the deflector 29 and optical condenser 30 in the radial direction of the disc 1. The drive means 38 may be any suitable one of known means using a servomotor. The operation of the drive means 38 is ceased when the output voltage of the differential detector is reduced to zero in the case of the information tracks 4 concentrically formed on the disc 1.

Referring to FIG. 4, the output of the frequency counter 34 representing the frequency of the reproduced standard signal coincides with the output of the retrieval instruction circuit 35 representing the frequency of the standard signal corresponding to the desired information track when the microspot 5 is moved onto the desired information track. The drive means 38 for moving the microspot 5 ceases to operate, and the disc 1 is solely under rotation so that the information recorded on the specific track can be applied from the demodulator 33 to a display 39 to be displayed thereon.

When one frame portion of a television picture signal is recorded on each of the concentric information tracks, this picture signal portion includes generally two vertical synchronizing pulses. Therefore, the deflector 29 may be driven in such a manner that the beam spot is moved from one information track to the adjacent one when one of these two vertical synchronizing pulses is detected. The beam spot is successively moved in this manner in response to the detection of the vertical synchronizing pulse until it is moved onto the information track having the desired picture information recorded thereon.

Description will then be directed to the case in which television picture signal is recorded on spiral information tracks. The manner of detecting the desired information track may be similar to that above described when the frequency of the standard signal recorded together with one frame portion of the picture signal does not change during this one frame portion but changes stepwise at intervals of one vertical synchronizing pulse period. The drive means 38 driving the deflector 29 and optical condenser 30 may be ceased to operate in a manner as described below when the frequency of the standard signal changes continuously during one frame portion of the picture signal. An output of the retrieval instruction circuit 35 representing the frequency of the standard signal at the starting position of one of the vertical synchronizing pulses in the frame portion corresponding to the desired information track may be applied to the comparator 36 to be compared with the output of the frequency counter 34. Thus, when the frequency of the standard signal extracted from the information track being traversed by the beam spot lies within the desired frequency range of the standard signal changing continuously during one frame portion, the drive means 38 is instructed to cease the traversing of the beam spot across the informtion tracks. The method of successively moving the beam spot across the spiral information tracks for moving the beam spot onto the desired information track will not be especially described herein since such method is described in detail in Philips Technical Review, Vol. 33, 1973, No. 7 cited previously.

The information track having the record of desired information thereon can be accurately detected and reproduced by the reproducing apparatus shown in FIG. 4 when the center of rotation 2 of the disc 1 during reproduction coincides exactly with the center of rotation 2 of the disc 1 during recording. Although such is not impossible, the reproducing apparatus must be fabricated to remarkably high precision resulting in a very high cost. It is very important to provide an inexpensive reproducing apparatus of this kind. These problems are obviated in the reproducing apparatus or information retrieval apparatus of the present invention. According to the present invention, the standard signal is utilized to attain the drawing control so that the microspot can be quickly and accurately positioned on a predetermined information track in the starting stage of reproduction or even when disturbance takes place. Further, this standard signal is also utilized to attain the fine tracking control so that the microspot can continuously and reliably track the predetermined information track subsequent to the drawing control.

In the reproducing apparatus shown in FIG. 4, the drive means 38 for moving the microspot 5 ceases to operate when the two inputs to the frequency comparator 36 coincide with each other, that is, when the output of the frequency counter 34 representing the frequency of the reproduced standard signal coincides with the output of the retrieval instruction circuit 35 representing the frequency of the standard signal corresponding to the desired information track. However, when the center of rotation of the reproducing apparatus and that of the desired information track on the disc do not register with each other, or when undesirable disturbance exist, out of registration or eccentricity occurs between the tracking path of the beam spot and the desired information track. Therefore, the tracking path of the beam spot does not register with the desired information track and traverse a plurality of information tracks including the desired information track. Further, when this traversing period of time is relatively short, the fine tracking control means cannot properly operate which is provided for the fine tracking control of the beam spot tracking the desired information track. According to the present invention, the standard signal is utilized so as to substantially extend the period of time during which the beam spot traverses the desired information track thereby facilitating the fine tracking control or drawing control. Further, subsequent to the attainment of the drawing control, the reproduced standard signal and wobbling of the information track are utilized so as to effect the fine tracking control accurately. The manner of this fine tracking control is described in detail in our U.S. application Ser. No. 439,039 cited previously.

Figure 5:
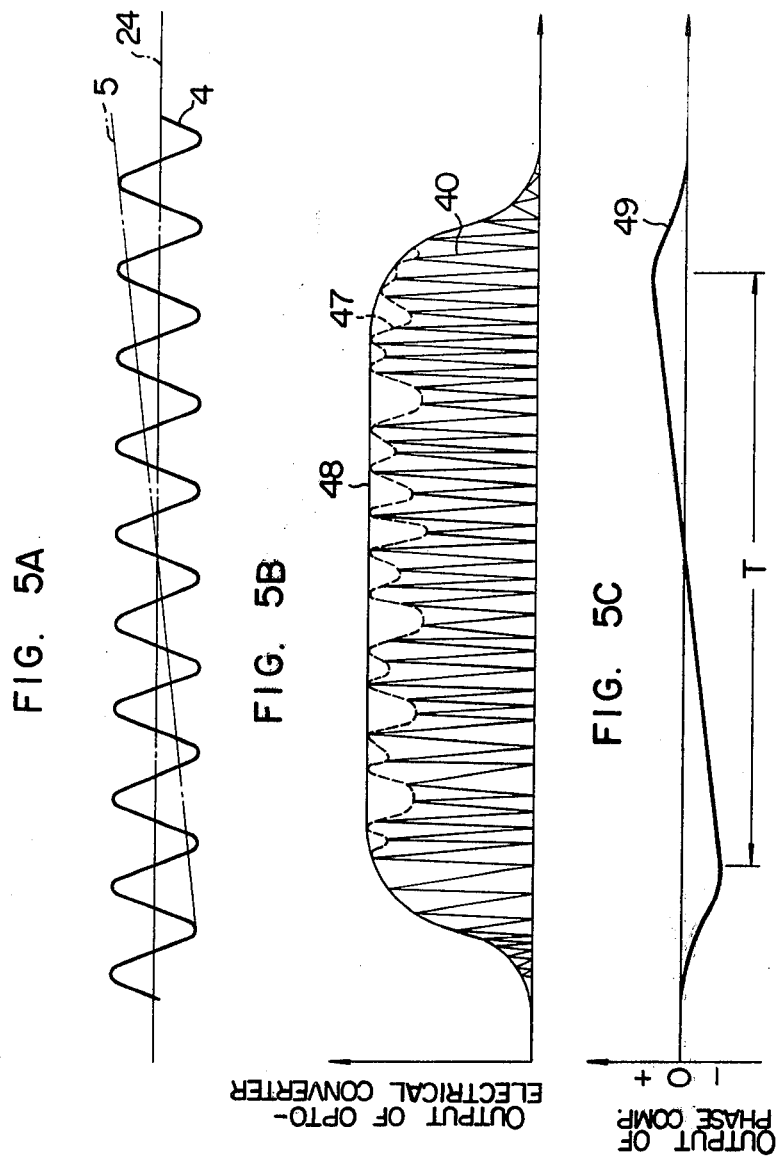
FIGS. 5A, 5B and 5C are waveform diagrams for illustrating the operation of various parts of the apparatus shown in FIG. 4.

FIG. 5A shows the relation between the tracking path 5 of the microspot and one of the information tracks 4 when out of registration as above described occurs. The centerline 24 in FIG. 5A is the same as that shown in FIG. 3. Therefore, the output of the opto-electrical converter 32 will be as shown in FIG. 5B when the microspot 5 tranverses the information track 4. It will be seen from FIG. 5B that the output 40 of the opto-electrical converter 32 is an amplitude modulation signal having a waveform as shown since the information track is wobbling. This output signal 40 is applied to an AM detector 41 to obtain an envelope signal 47 having a waveform as shown in FIG. 5B. The output signal 40 is also applied to a low-pass filter 42 to obtain an output signal 48 having a waveform as shown in FIG. 5B. The reproduced standard signal output of the demodulator 33 is applied to a synchronous rectifier or phase comparator 43 to be used as a reference signal for synchronous rectification of the amplitude modulation signal 47 applied from the AM detector 41. Thus, the phase comparator 43 provides an output signal 49 having a waveform as shown in FIG. 5C. This phase comparator 43 may be any suitable one of various known comparators of this kind. This signal 49 indicates the degree and direction of deviation of the beam spot 5 from the centerline 24 of the wobbling information track 4. It will be seen in FIG. 5C that this output signal 49 has a negative (or positive) sign when the beam spot 5 lies on the radially inner side of the disc 1 relative to the centerline 24 of the wobbing information track 4, and the level thereof corresponds to the amount of deviation of the beam spots from the centerline 24 of the wobbling information track 4. The output signal 49 is nil when the beam spot 5 lies exactly on the centerline 24 of the wobbling information track 4. On the other hand, the output signal 49 has a positive (or negative) sign when the beam spot 5 lies on the radially outer side of the disc 1 relative to the centerline 24 of the wobbling information track 4, and the level thereof corresponds to the amount of deviation of the beam spot 5 from the centerline 24 of the wobbling information track 4. The symbol T represents the period of time during which the beam spot 5 traverses the information track 4.

The block 44 comprises a wave shaper for shaping the waveform of the envelope signal output 47 of the AM detector 41 and a counter for counting the number of peaks appearing in the envelope signal 47 during the period of time T. The counter operates only during the period of time T in which the output 48 appears from the low-pass filter 42 thereby counting the number of peaks appearing in the envelope signal output 47 of the AM detector 41 during this period of time T. The counter provides an output which is inversely proportional to the number of counted peaks. That is, the counter detects the speed of deviation of the beam spot 5 from the centerline 24 of the wobbling information track 4. The output of the phase comparator 43 is applied to a polarity detector 45 which detects the traversing direction of the beam spot 5 traversing the centerline 24 of the information track 4. The polarity signal output of the polarity detector 45 and the output of the speed counter 44 are applied to a driver 46 for the deflector 29, and the driver 46 generates a control signal for controlling the deflector 29.

In the embodiment shown in FIG. 4, the number of peaks of the envelope signal 47 is counted by way of example for detecting the speed of deviation of the beam spot 5 from the centerline 24 of the wobbling information track 4. However, means for generating a pulse train having a constant pulse interval may be provided, and the number of such pulses may be counted during the period of time T.

It will be understood from the above description that the beam spot moved close to the desired information track is subject to the drawing control to cancel the gap existing between the beam spot and the desired information track due to disturbance such as eccentricity of the information tracks on the disc, so that the deviation of the beam spot from the desired information track can be reduced within the range of eccentricity. The beam spot traverses one information track with an extended period of time due to the above manner of drawing control. During this elongated period of time, the information signal and standard signal are reproduced from the output 40 of the opto-electrical converter 32 to be separated from each other, and the frequency of the reproduced standard signal is counted by the frequency counter 34. The deviation of the desired information track and the traversed information track is detected, and the beam spot is finely moved so that the tracking path of the beam spot can register with the desired information is reproduced while making tracking control for preventing escapement of the beam spot from the desired information track.

Figure 6:
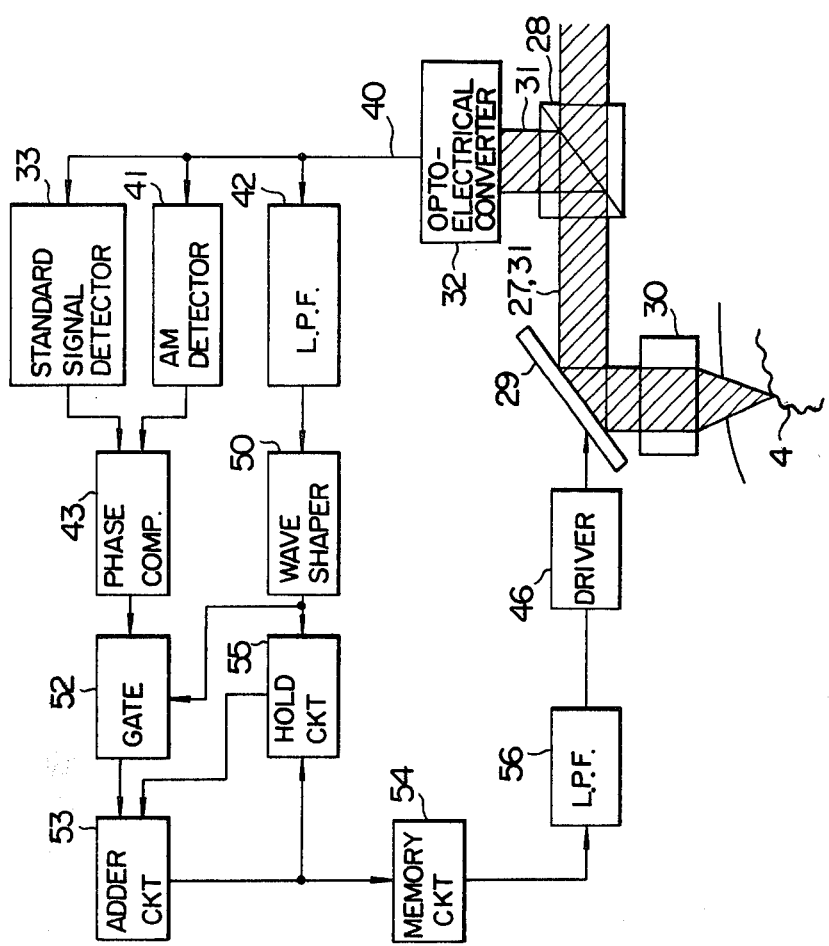
FIG. 6 is a block diagram showing the structure of a drawing control section in another embodiment of the information retrieval or reproducing apparatus according to the present invention.

FIG. 6 is a block diagram showing the structure of another form of the drawing control section. In the drawing control section shown in FIG. 6, the drawing control is attained by detecting the amount and direction of deviation. In FIG. 6, the same reference numerals are used to denote the same parts appearing in FIG. 4. Inasmuch as these parts in FIG. 6 operates in entirely the same manner as those in FIG. 4, any detailed description of the operation thereof is unnecessary.

When the information tracks on the disc are eccentric relative to the center of rotation of the disc, the opto-electrical converter 32 provides an output signal 40 having a waveform as shown in FIG. 7A when the disc makes one complete rotation. The numbers 1 to M in FIG. 7 correspond to the respective information tracks traversed by the beam spot due to the presence of eccentricity. The output signal 40 of the opto-electrical converter 32 includes signal portions shown by the hatching in FIG. 7A. This output signal 40 is applied to the demodulator or standard signal detector 33, AM detector 41 and low-pass filter 42. The output of the AM detector 41 and the output of the standard signal detector or reproducer 33 are applied to the phase comparator 43. This phase comparator 43 produces an output having a waveform as shown in FIG. 7B. The output of the low-pass filter 42 is applied to a wave shaper 50. An output signal having a constant amplitude appears from this wave shaper 50 during only the period of time TN (N = 1 to M) in which the beam spot traverse the corresponding information track. This output signal is applied to a gate 52 to turn on the same. Therefore, the output of the phase comparator 43 is allowed to pass through the gate 52 during only the period of time TN (N = 1 to M) to be applied to an adder circuit 53. Consequently, an output having a waveform as shown in FIG. 7C appears from the gate 52. The output of the adder circuit 53 is applied to a memory circuit 54 and a hold circuit 55.

This hold circuit 55 acts to hold the output of the adder circuit 53 in response to the on-off of the pulses applied from the wave shaper 50. Thus, an output having a waveform as shown in FIG. 7D appears from the adder circuit 53 which is connected to the hold circuit 55. In the memory circuit 54, the output of the adder circuit 53 is subject to sampling by clock pulses of suitable frequency during the period of time in which the disc makes one complete rotation, and the individual sampled signal values are stored in the memory circuit 54. The black dots on the curve shown in FIG. 7D represent these signal values stored in the memory circuit 54. The signal portions stored in the memory circuit 54 represent the variations relative to time of the output of the adder circuit 53 during one complete rotation of the disc, that is, the variations of the eccentricity relative to time. These signal portions are successively delivered from the memory circuit 54 according to the order in which they are stored in response to the application of the clock pulses.

Upon completion of the storage of the signal in the memory circuit 54 during one complete rotation of the disc in the manner above described, the output of the memory circuit 54 is applied, during the next stage of one complete rotation of the disc, to the driver 46 for driving the deflector 29. The block 56 in FIG. 6 comprises a low-pass filter for smoothing the output of the memory circuit 54. However, this low-pass filter may be unnecessary depending on the operating characteristic of the deflector 29.

It will be understood from the description given with reference to FIGS. 6 and 7 that the amplitude (amount) and direction of eccentricity are detected for attaining the drawing control, and the variation of the eccentrity relative to time is especially detected for detecting the amount of eccentricity. More precisely, the amount of eccentricity is constant and equal to the width of the information track during the period time T in which the beam spot traverses the information track. Further, the direction of eccentricity is represented by the polarity of the output of the phase comparator 43. Therefore, the amount and direction of eccentricity encountered during one complete rotation of the disc can be measured by dividing the period of one complete rotation of the disc by the periods of time $T_1$ to $T_M$ required for the beam spot to traverse the individual information tracks and by the periods of time required for the beam spot to traverse the spaces between the individual information tracks, and then adding together the outputs of the phase comparator 43 appearing during these periods of time. In the case of FIG. 7, however, the output value of the phase comparator 43 appeared during $T_N$ or zero is used as the comparator output during $t_N$ is which the beam spot moves from the Nth information track to the (N+1)th information track.

As an alternative method for detecting the amount of eccentricity, the number of zero cross points in the signal shown in FIG. 7B may be counted. Due to the fact that the output value of the phase comparator 43 changes necessarily from the positive to the negative or from the negative to the positve when the beam spot traverses one of the information tracks, counting of the number of zero cross points is equivalent to counting the number of information tracks traversed by the beam spot. Thus, the amount of eccentricity can be detected by counting the number of zero cross points.

It will be understood from the above description that, by detecting the amount and phase of eccentricity observed during one complete rotation of the disc for the control of the beam spot, the beam spot can be positioned on the information track for an elongated period of time, and the desired drawing control can be successfully attained even with a deflector of the kind using means such as a galvanometer having a frequency characteristic which is not so satisfactory. Thus, the desired fine tracking control can be achieved by inexpensive means.

We claim:

1. An information retrieval or reproducing apparatus comprising:
    a. means for causing rotation of a rotary recording medium, said rotary recording medium having an information signal and a standard signal recorded in superposed relation on a plurality of information tracks wobbling along concentric circles or a spiral line, said standard signal having a frequency varying depending on the recorded position, wherein the frequency of the wobbling is equal to and synchronized with the standard signal frequency;
    b. means for directing a reproducing radiation beam toward said information tracks on said rotary recording medium to produce a beam spot thereon;
    c. beam-electrical converter means for converting into an electrical signal the radiation beam directed from said beam directing means toward one of said information tracks and passing therethrough or reflected therefrom;

d. first detecting means for detecting a signal including information relating to deviation of the radiation beam spot from said information track in response to the application of the output signal thereto from said beam-electrical converter means;

e. demodulator means for reproducing the information signal and standard signal from the output signal of said beam-electrical converter means to separate the standard signal from the information signal;

f. retrieval instructing means capable of generating a plurality of signals having the same frequencies as those of the standard signal recorded together with the information signal to be reproduced;

g. comparator means for comparing the reproduced standard signal applied from said demodulator means with the output signal of said retrieval instructing means;

h. second detecting means for detecting the amount and direction of the deviation of said beam spot from said information track by comparing the reproduced standard signal applied from said demodulator means with the output signal of said first detecting means;

i. means responsive to the output signal of said comparator means for controlling the relative position between said radiation beam directing means and said rotary recording medium;

j. radiation beam deflecting means for deflecting the direction of the radiation beam obtained by said radiation beam directing means; and k. fine tracking control means responsive to the output of said second detecting means for driving said radiation beam deflecting means so as to compensate for the deviation of said beam spot from said information track.

2. An information reproducing apparatus as claimed in claim 1, wherein said radiation beam is an optical beam.

3. An information reproducing apparatus as claimed in claim 1, further comprising drawing control means comprising third detecting means for detecting the traverse of said beam spot across the information track and means responsive to the output of said third detecting means for driving said radiation beam deflecting means so as to lengthen the time required for said beam spot to transverse the information track.

4. An information reproducing apparatus as claimed in claim 3, wherein said third detecting means comprises traversing speed detecting means for detecting the traversing speed of said beam spot when it traverses said information track.

5. An information reproducing apparatus as claimed in claim 4, wherein said traversing speed detecting means comprises means for detecting, on the basis of the output signal of said beam-electrical converter means, the period of time in which said beam spot traverses said information track, and means for counting the number of peaks which have occurred in the standard signal contained in said output signal of said beam-electrical converter means during said traversing period of time.

6. An information reproducing apparatus as claimed in claim 4, wherein said traversing speed detecting means comprises means for detecting, on the basis of the output signal of said beam-electrical converter means, the period of time in which said beam spot traverses said information track, and means for counting the number of peaks appearing during said traversing period of time in the output of said first detecting means including the information relating to the wobbling of said information track.

7. An information reproducing apparatus as claimed in claim 4 wherein said traversing speed detecting means comprises means for detecting, on the basis of the output signal of said beam-electrical converter means, the period of time in which said beam spot tranverses said information track, and means for counting within said traversing period of time the number of pulses having a constant pulse interval and generated by an external pulse generator.

8. An information reproducing apparatus as claimed in claim 3, wherein said third detecting means comprises means for detecting the amount and direction of deviation of said information track on said rotary recording medium, and said means responsive to the output of said third detecting means comprises means responsive to the output signal of said deviation detecting means to drive beam spot deflecting means in a direction in which the deviation of said beam spot from said information track is cancelled.

9. An information reproducing apparatus as claimed in claim 8, wherein said means for detecting the amount and direction of the deviation comprises means for counting the number of information tracks traversed by said beam spot during the period of time in which said rotary recording medium makes one complete rotation.

10. An information reproducing apparatus as claimed in claim 9, wherein said means for counting the number of information tracks traversed by said beam spot during one complete rotation of said rotary recording medium counts the number of zero cross points in the output of said first detecting means which detects the signal including the information relating to deviation of said beam spot from said information track.

11. A rotary recording medium comprising a recording surface having an information signal and a standard signal recorded in superposed relation on a plurality of information tracks wobbling along concentric circles or a spiral line, said standard signal, at a given track, having a frequency varying depending on the recorded position of said track, wherein the frequency of track wobbling is equal to and synchronized with the frequency of the standard signal.

12. A rotary recording medium as claimed in claim 11, wherein said information tracks are formed on a disc.

13. A rotary recording medium as claimed in claim 11, wherein said information tracks are concentrically formed, and the frequency of the standard signal recorded on anyone of said information tracks differs from that recorded on the adjacent one.

14. A rotary recording medium as claimed in claim 11, wherein said information tracks are spirally formed, and the frequency of the standard signal recorded on said information tracks varies continuously.

15. A rotary recording medium as claimed in claim 11, wherein said information tracks are spirally formed, and the frequency of the standard signal recorded on said information tracks varies stepwise.

16. A rotary recording medium as claimed in claim 11, wherein said information tracks are formed on a drum.

17. An information recording apparatus comprising:

a. means for causing rotation of a rotary recording medium;

b. means for directing a recording radiation beam toward the recording surface of said rotary recording medium;
c. tracking means for controlling the position of the spot of said radiation beam on said recording medium relative to the position of said recording medium during recording;
d. oscillator means cooperating with said tracking means for generating a standard signal having a frequency varying depending on the position of said tracking means;
e. an information signal source;
f. beam modulator means for modulating said radiation beam by the signal obtained by superposing the output of said oscillator means on the output of said information signal source and
g. wobbling means for causing oscillation or wobbling of the beam spot on said recording surface of said rotary recording medium in a direction normal to the direction of rotation of said rotary recording medium, wherein the wobbling frequency is equal to and synchronized with the standard signal frequency.

18. An information recording apparatus as claimed in claim 17, wherein said radiation beam is an optical beam.

19. An information recording apparatus as claimed in claim 17, wherein the frequency of the standard signal varies continuously.

20. An information recording apparatus as claimed in claim 17, wherein the frequency of the standard signal varies stepwise.

* * * * *